(12) United States Patent
Oi

(10) Patent No.: US 8,732,723 B2
(45) Date of Patent: May 20, 2014

(54) EXECUTION APPARATUS AND METHOD

(75) Inventor: Hirokazu Oi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1594 days.

(21) Appl. No.: 11/627,701

(22) Filed: Jan. 26, 2007

(65) Prior Publication Data

US 2007/0180442 A1 Aug. 2, 2007

(30) Foreign Application Priority Data

Feb. 1, 2006 (JP) .................................. 2006-024740

(51) Int. Cl.
*G06F 3/00* (2006.01)
*G06F 9/45* (2006.01)
*G06F 9/54* (2006.01)
*G06F 9/445* (2006.01)

(52) U.S. Cl.
CPC ..................... *G06F 9/544* (2013.01); *G06F 9/445* (2013.01)
USPC .......................................... 719/312; 717/148

(58) Field of Classification Search
CPC ....................................................... G06F 9/445
USPC .......................... 719/310, 332; 718/1; 717/166
See application file for complete search history.

(56) References Cited

U.S. PATENT DOCUMENTS

| 6,044,467 A * | 3/2000 | Gong ................................. 726/4 |
| 6,260,078 B1 | 7/2001 | Fowlow |
| 6,449,720 B1 * | 9/2002 | Sprague et al. ............... 713/171 |
| 6,584,612 B1 * | 6/2003 | Mueller et al. ............... 717/166 |
| 6,701,335 B2 | 3/2004 | Pupalaikis |
| 6,826,750 B1 * | 11/2004 | Curtis et al. ................... 717/170 |
| 7,406,687 B1 * | 7/2008 | Daynes et al. ................. 717/166 |
| 2002/0188935 A1 * | 12/2002 | Hertling et al. ............... 717/170 |
| 2004/0168163 A1 | 8/2004 | Choi et al. |
| 2006/0059156 A1 * | 3/2006 | Janes et al. ......................... 707/9 |
| 2009/0094316 A1 * | 4/2009 | Chen et al. .................... 709/203 |
| 2012/0017204 A1 * | 1/2012 | Hrischuk et al. .............. 717/151 |

FOREIGN PATENT DOCUMENTS

| CN | 1519709 | 8/2004 |
| JP | 2002-014817 | 1/2002 |
| WO | 2004059425 A2 | 7/2004 |

OTHER PUBLICATIONS

Li Gong, Implementing Protection Damains in the Java Development kit 1.2, 1998.*
XP002525133, Smith, Chris,"Custom ClassLoader—changing order of loading to look in my loaderfirst", pp. 1-4, retrieved on Apr. 23, 2009.
XP002525134, Binildas Christudas, "Internals of Java Class Loading", pp. 1-4, retreived on Jan. 26, 2005.
XP002525135, "Understanding Extension Class Loading", pp. 1-2, retrieved Feb. 14, 2008.
Translation of Chinese Office Action concerning Appln 2007100028187 dated Apr. 18, 2008.
Japanese Office Action for Appln. No. 2006-024740 dated Sep. 9, 2011.
Schaefer, "Inside Class Loaders" ONJava.com, O'Reilly Media, Inc., 2009, pp. 1-7.

* cited by examiner

*Primary Examiner* — Lechi Truong
(74) *Attorney, Agent, or Firm* — Carter, DeLuca, Farrell & Schmidt LLP

(57) ABSTRACT

An execution apparatus that executes a computer program executes the computer program and loads a class that is requested while the computer program is being executed. The loaded class is the class in response to the computer program that is being executed.

9 Claims, 14 Drawing Sheets

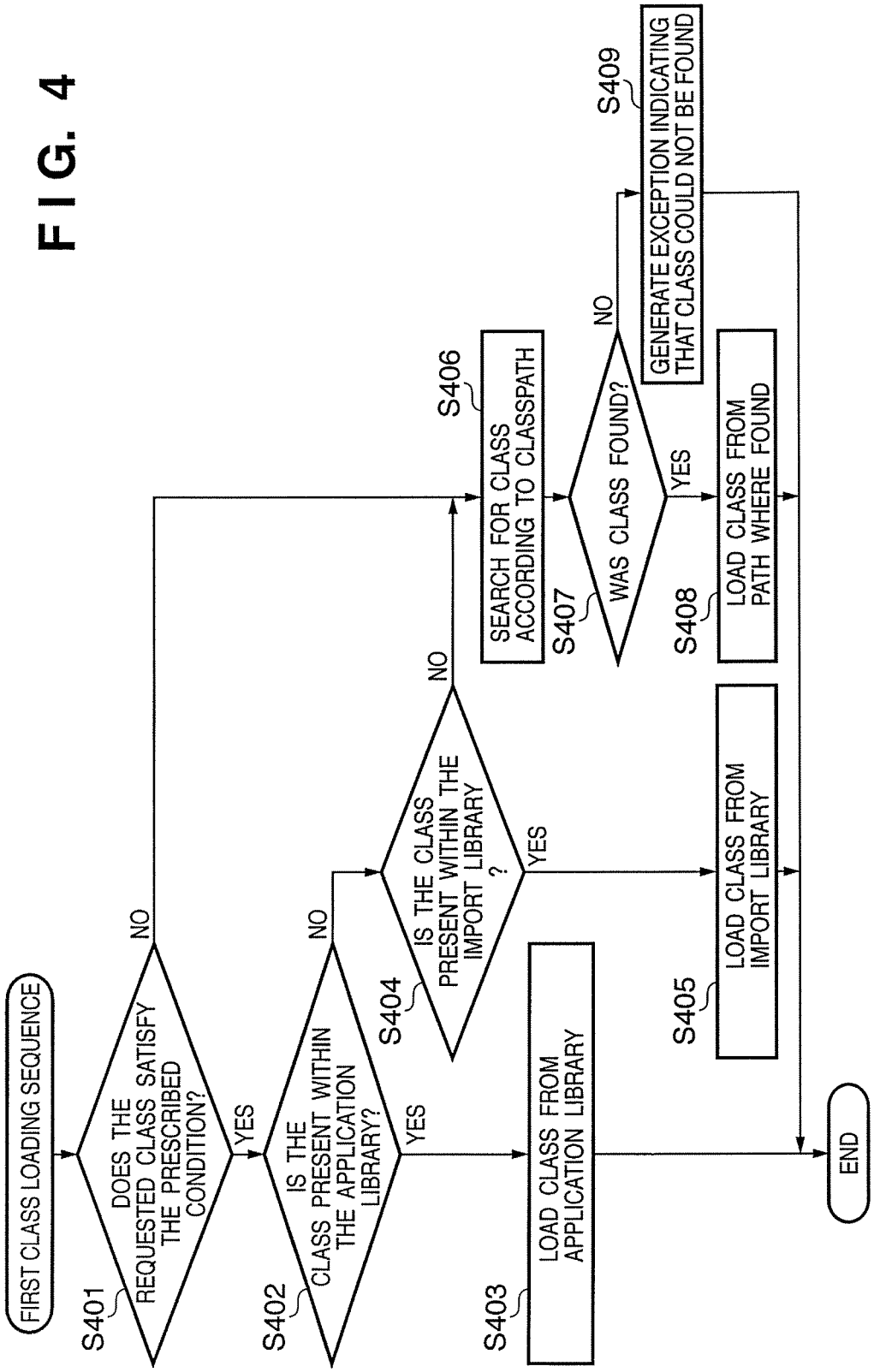

FIG. 9

| APPLICATION | LIBRARY | VERSION | POSITION OF PRIORITY LIBRARY WHERE CLASS IS LOADED FROM |
|---|---|---|---|
| AAA | aaa.jar | — | APPLICATION LIBRARY |
| | bbb.jar | — | APPLICATION LIBRARY |
| BBB | aaa.jar | — | SYSTEM LIBRARY |
| | ccc.jar | — | SYSTEM LIBRARY |
| CCC | aaa.jar | LESS THAN 2.0 | APPLICATION LIBRARY |
| | aaa.jar | 2.0 OR LATER | SYSTEM LIBRARY |

| APPLICATION | LIBRARY | VERSION | POSITION OF FIRST PRIORITY LIBRARY WHERE CLASS IS LOADED FROM | POSITION OF SECOND PRIORITY LIBRARY WHERE CLASS IS LOADED FROM | POSITION OF THIRD PRIORITY LIBRARY WHERE CLASS IS LOADED FROM |
|---|---|---|---|---|---|
| AAA | aaa.jar | — | APPLICATION LIBRARY 1 | APPLICATION LIBRARY 2 | SYSTEM LIBRARY |
| AAA | bbb.jar | — | APPLICATION LIBRARY | IMPORT LIBRARY | SYSTEM LIBRARY |
| BBB | aaa.jar | — | SYSTEM LIBRARY | APPLICATION LIBRARY | N/A |
| BBB | ccc.jar | — | SYSTEM LIBRARY | APPLICATION LIBRARY | IMPORT LIBRARY |
| CCC | aaa.jar | LESS THAN 2.0 | APPLICATION LIBRARY | IMPORT LIBRARY | SYSTEM LIBRARY |
| CCC | aaa.jar | 2.0 OR LATER | SYSTEM LIBRARY | APPLICATION LIBRARY | IMPORT LIBRARY |

EXECUTION APPARATUS AND METHOD

BACKGROUND OF THE INVENTION

1. Field of the Invention

The invention relates to an execution apparatus for executing a computer program.

2. Description of the Related Art

With regard to an apparatus that executes a computer program, an apparatus exists that loads a program from an external source that is equipped with a function that the apparatus is attempting to execute, in a case where the program is not loaded, and executes the program.

An example of the present apparatus is an apparatus that is outfitted with Java Virtual Machine, or JavaVM (Java is a trademark or registered trademark of Sun Microsystems Inc. in the U.S. and other countries). When the apparatus that is outfitted with JavaVM executes a Java application, it is able to load a required Java class from a class library that exists either within or without the apparatus (class loading). The component of JavaVM that is concerned with class loading is called the ClassLoader. Where the ClassLoader loads a class from is determined by a classpath configuration, as well as by the action of the ClassLoader itself.

In a case that the ClassLoader to be used is not specified, the SystemClassLoader that is built into JavaVM is used. The SystemClassLoader loads a class according to the classpath configuration. The classpath enumerates one or more paths, or locations where a class is loaded. The SystemClassLoader executes a class search through the path enumeration sequence, in descending order of priority. It is also possible to specify the ClassLoader to be used, in which case class are searched for and loaded according to the definition of the specified ClassLoader.

When the ClassLoader loads a class, a check is initially performed to ascertain whether or not the class to be loaded is present within JavaVM or within a library that is being provided in conjunction with JavaVM (Java System). If the class is present within the Java System, it is loaded therefrom. In other words, priority is given to loading from within the Java System, even if the required class is known to be located externally, together with the application. The first reason for doing so is that a class within the Java System ensures that Java functionality will be provided, thus maintaining interoperability of Java functionality. The second reason is that a class within the Java System is a solid class, with consideration for class security within the Java System.

Related art pertaining to class loading is cited in U.S. Pat. No. 6,260,078 and U.S. Pat. No. 6,701,335.

After the class library provided together with the application is stored within the Java System, the application loads classes from the class library within the Java System. Hence, the necessity for bundling the class library with the application is eliminated. The following sort of problem arises, however, if the version of the class library that is bundled with the application differs from the version of the class library that is located within the Java System.

The class library that is bundled with the application is guaranteed to work with the application. Attempting, instead, to use the class library that is located within the Java System, with a different version from the class library that is bundled with the application, however, may cause a fault to occur, owing to the fact that the class library that is located within the Java System is not guaranteed to work with the application. Such a condition may arise, for example, when installing a legacy application with which an old class library is bundled into a new Java System comprising a new class library. It is a nuisance to alter the legacy application in such a circumstance in a manner that would avoid the fault. The method of always using the class that is bundled with the application is also undesirable from a security standpoint.

Japanese Patent Laid Open No. 2002-014817 discloses a file distribution system that uses a computer network to distribute a program file. The file distribution system compares the version of a program module that is loaded into a file system of server with the version of a program module that is installed on a file system of client. The program module that is loaded into the file system of server is downloaded only in case that its version is newer than the version of the program module that is installed on the file system of client.

SUMMARY OF THE INVENTION

An objective of the present invention is to ensure stable running of a program.

Another objective of the present invention is to avoid prolonged class load time.

According to the present invention, there is provided an execution apparatus that executes a computer program, comprising an execution unit configured to execute a computer program, and a loading unit configured to load a class that is requested while the computer program is being executed, wherein the loading unit loads the class corresponding to the computer program that is being executed.

According to the present invention, there is provided an execution apparatus that executes an application program, comprising an execution unit configured to execute an application program, and a search unit configured to search for a class that is requested by the application program, wherein the search unit searches with priority given to an application library, rather than a system library.

According to the present invention, there is provided an execution apparatus that executes a computer program, comprising an execution unit configured to execute a computer program, and a search unit configured to search for a class that is requested by the computer program, wherein the search unit searches with priority given to an import library, rather than a system library.

According to the present invention, there is provided an execution apparatus that executes an application program, comprising an execution unit configured to execute an application program, and a loading unit configured to load a class that is requested while the application program is being executed, wherein the loading unit loads the class from the application library in a case that the application library version differs from the system library version.

According to the present invention, there is provided an execution apparatus that executes an application program, comprising an execution unit configured to execute an application program, and a loading unit configured to load a class that is requested while the application program is being executed, wherein the loading unit loads the class from the application library, in a case that the version of the class within the application library differs from the version of the class within the system library.

According to the present invention, there is provided an execution method that executes a computer program, comprising the steps of executing a computer program, and loading a class that is requested while the computer program is being executed, wherein the class is loaded in correspondence with the computer program that is being executed.

Further features of the present invention will become apparent from the following description of exemplary embodiments (with reference to the attached drawings).

BRIEF DESCRIPTIONS OF THE DRAWINGS

The accompanying drawings, which are incorporated in and constitute a part of the specification, illustrate embodiments of the invention and, together with the description, serve to explain the principles of the invention.

FIG. 4 is a flowchart explaining a class loading sequence that is executed in step S306 according to a first embodiment (first class loading sequence).

FIG. 9 depicts a view illustrating an example of a library information table according to the fifth embodiment.

FIG. 11 depicts a view illustrating an example of a library information table according to the sixth embodiment.

DESCRIPTION OF THE EMBODIMENTS

Preferred embodiments of the present invention will be described in detail, with reference to the attached drawings. The embodiments do not limit the present invention with regard to scope of claims, nor are all combinations of characteristics described in the embodiments necessary to the solution of the present invention.

Figure 1:
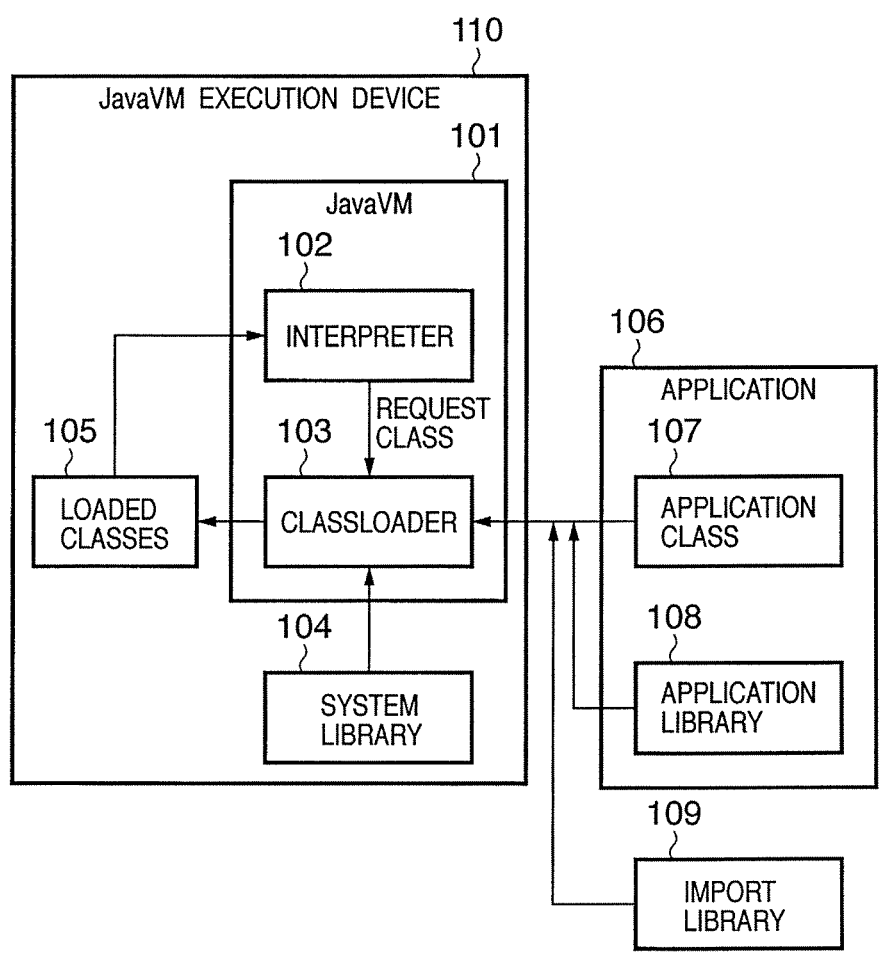
FIG. 1 is a block diagram depicting the assembly of a Java program execution system according to an embodiment of the present invention.

FIG. 1 is a block diagram depicting the assembly of a Java program execution system according to the embodiment of the present invention.

In FIG. 1, a JavaVM 101 comprises an interpreter 102 and a classloader 103. The interpreter 102 interprets and executes Java byte code. A system library 104 is a system library that is provided together with the JavaVM 101 (the system library). loaded classes 105 are classes that are loaded into a memory and rendered executable.

An application 106 is an application that is written in the Java language. An application class 107 is a main class for the operation of the application 106. An application library 108 is a class library, or application library, that is provided together with the application 106. An import library 109 refers to a class library that is used in a part of the operation of the application 106, while remaining outside of the application 106. A reference numeral 110 denotes a JavaVM execution apparatus.

In FIG. 1, the application 106 comprises the application class 107 and the application library 108. The JavaVM execution apparatus 110 comprises the JavaVM 101, the system library 104, and the loaded classes 105. It is permissible for the JavaVM 101 and the application 106 to coexist within the same apparatus, that is, the JavaVM execution apparatus 110. A form wherein the application 106 is installed in an external apparatus, and loaded and executed using a network unit by the JavaVM 101 is also permissible.

Figure 2:
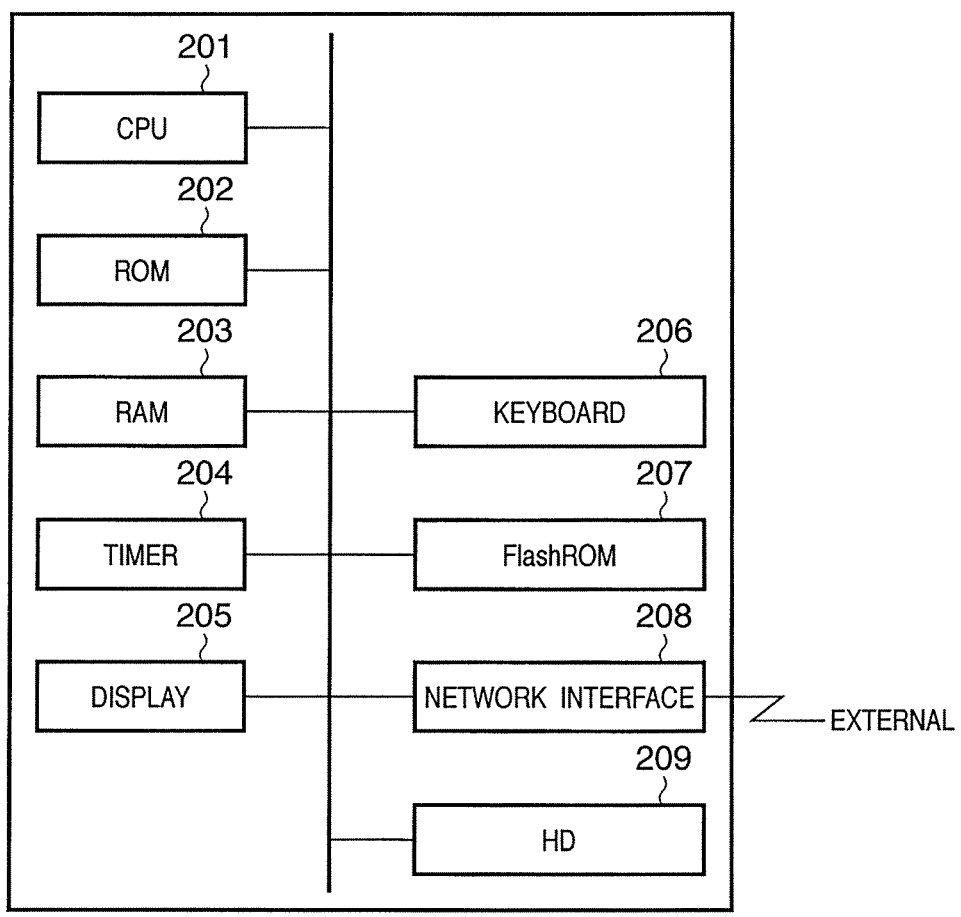
FIG. 2 is a block diagram describing the hardware assembly of a JavaVM execution apparatus according to the embodiment of the present invention.

FIG. 2 is a block diagram describing the hardware assembly of the JavaVM execution apparatus 110 according to the embodiment.

In the figure, a reference numeral 201 denotes a central processing unit, or CPU, that controls the overall apparatus. A ROM 202 stores, in a machine-readable format, the various types of programs or data that are executed by the CPU 201. A RAM 203 is used as a workspace wherein the CPU 201 temporarily saves various types of data. A timer 204 measures various types of time intervals according to the instructions of the CPU 201. A display unit 205 is for displaying a user interface, and may possess, for example, an LCD, a plasma screen, or other display panel. A keyboard 206 possess a full range of operating keys, as well as a mouse or other pointing device, and is used for inputting, by user operation, directions to execute the application, as well as all other commands or data. A flash ROM 207 provides nonvolatile storage of all types of configuration data or files. Numeral 208 denotes a network interface, for connecting via network to an external apparatus. A hard disc drive (HD) 209 stores an operating system, all types of application programs, or other software pre-installed, and also saves all types of configuration data files.

In the present circumstance, the interpreter 102 and the classloader 103, in program form, are, for example, stored in the ROM 202 and read out and executed by the CPU 201. It is also permissible for the interpreter 102 and the classloader 103 to be stored on the hard disc drive 209. The system library 104 is loaded into either the flash ROM 207 or the hard disc drive 209. The loaded classes 105 are loaded into the RAM 203. The application 106 and the import library 109 are loaded into either the flash ROM 207 or the hard disc drive 209, if they are located within the same apparatus as the JavaVM execution apparatus 110. If the application 106 and the import library 109 are located within another external apparatus, they are located within a storage medium that is appropriated to the external apparatus.

Pursuant to the foregoing, in most instances, the hardware that constitutes the primary body of the operation is the CPU 201 that controls the apparatus, and thus, the primary body of the operation will not be specified in every instance, except in exceptional circumstances.

Figure 3:
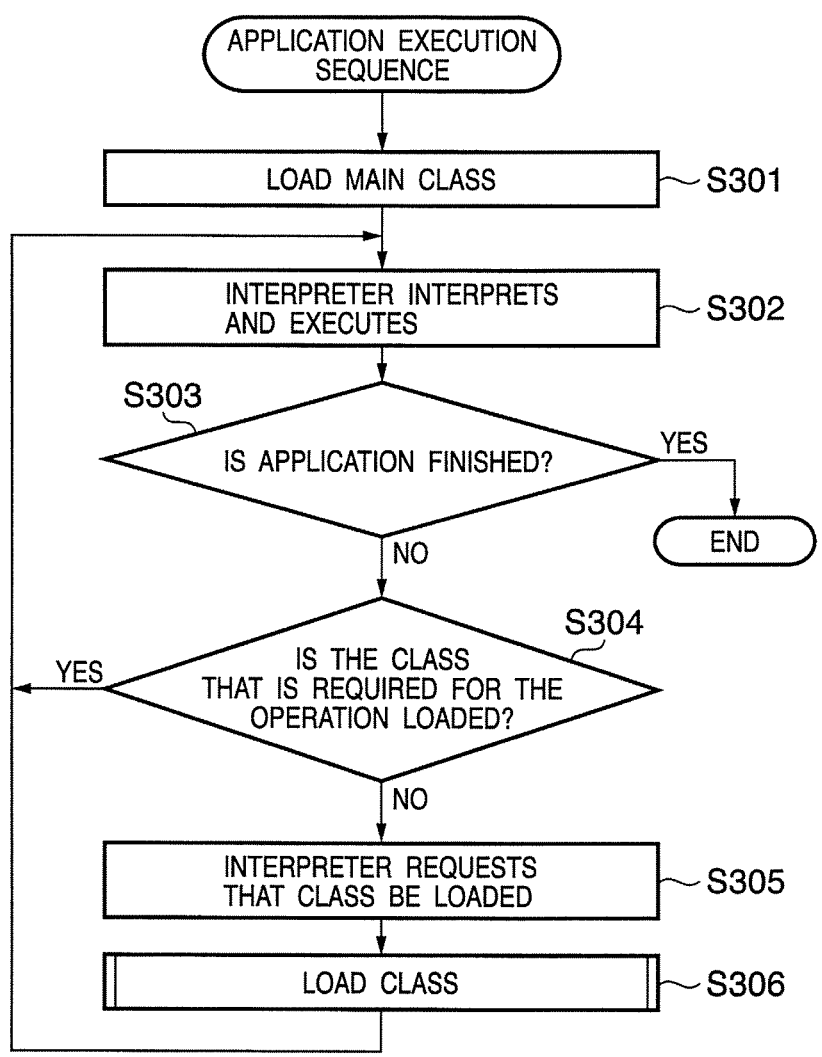
FIG. 3 is a flowchart explaining an application execution sequence as pertaining to a JavaVM execution apparatus according to the embodiment of the present invention.

Following is a description of the execution sequence in the application 106, using the flowchart in FIG. 3.

FIG. 3 is a flowchart explaining an application execution sequence as pertaining to the JavaVM execution apparatus 110 according to the embodiment.

In step S301, the classloader 103 loads the class that will be the main class of the application 106, that is, the initially called class, from the application class 107. The class thus loaded is loaded into the RAM 203 as one of the loaded classes 105. In step S302, the main class that is one of the loaded classes 105 is read out, interpreted, and executed by the interpreter 102, which executes the interpretation and execution processing until the application 106 terminates.

Consequently, the application 106 is monitored constantly in step S303 to determine whether the application 106 has terminated or not.

If the application 106 terminates in step S303, the execution sequence ends. If the application 106 does not terminate, the process proceeds to step S304, wherein the interpreter 102 determines whether or not the class that is required to execute the next block of byte code has been loaded into the loaded classes 105. If the class has been loaded, the process proceeds to step S302, returning to the step of interpretation and execution of the application 106.

On the other hand, if the necessary class has not been loaded in step S304, the process proceeds to step S305, wherein the interpreter 102 requests that the classloader 103 load the necessary class. Upon receipt of the request, the classloader 103 loads the requested class, in step S306. When the loading of the class is completed, the process returns to the interpretation and execution step S302.

Following is a description of the respective embodiments of the class loading process that is executed in FIG. 3, step S306.

First Embodiment

FIG. 4 is a flowchart explaining a class loading sequence that is executed in step S306 according to the first embodiment (first class loading sequence).

In step S401, the classloader 103 determines whether or not the class that is requested by the interpreter 102 satisfies a pre-established condition. In concrete terms, a first determination method involves checking whether or not the classname satisfies the following conditions (note that a classname in Java takes the form of one or a plurality of strings of text characters, connected by periods):

The First Determination Method:
1. The classname of the requested class exactly matches one or a plurality of strings of text characters that is already stored in the RAM 203 or other storage medium;
2. The header of the classname of the requested class matches one or a plurality of strings of text characters that is already stored;
3. A segment of the classname of the requested class contains one or a plurality of strings of text characters that is already stored.

The pre-determined condition to be satisfied by the class that is requested by the interpreter 102, that is, the one or the plurality of strings of text characters that are compared with the classname of the requested class, is selected from 1-3, foregoing, as being a desirable condition with regard to the operation of the JavaVM execution apparatus 110. The conditions illustrate the conditions to be satisfied by a name of a class, the loading of which from the application library 108 is desired. Accordingly, the following steps will attempt to load a class from the application library 108 that satisfies any of the conditions. The application library 108 is bundled with the application 106, and operation evaluation is typically already completed. In other words, stable operation is guaranteed. Even with classes that are present within the application library 108, it may be preferable to use classes that have been updated within the system library in a given instance, and it may instead be preferable to use classes for which stable operation is guaranteed within the application library in another instance. Consequently, it is possible to assign priority in loading from the application class 107 for only a specified class.

Any of the above described three conditions may be utilized; for example, it would be permissible to combine a given class with condition 1, and another class with condition 2.

A second determination method involves checking whether or not the package name satisfies the following conditions. A package name in Java refers to the part of the classname that precedes the final period. For example, if the classname is "com.xxx.project1.module1.type1.class1", then the package name is "com.xxx.project1.module1.type1". While it is not absolutely necessary for a class to have a package name, in a case that a name is assigned to the class, a package name is attached in order to avoid a classname collision, or in other words, to protect a namespace. Assigning a package name based on such a consistent concept facilitates identifying the creator of a class (corporation) or the category of a class:

The Second Determination Method:
1. The package name exactly matches one or a plurality of strings of text characters that is already stored in the RAM 203 or other storage medium;
2. The header of the package name matches one or a plurality of strings of text characters that is already stored;
3. A segment of the package name contains one or a plurality of strings of text characters that is already stored.

The pre-determined condition to be satisfied by the class that is requested by the interpreter 102, that is, the one or the plurality of strings of text characters that are compared with the package name of the requested class, is selected from the conditions 1-3, foregoing, as being a desirable condition with regard to the operation of the JavaVM execution apparatus 110. The conditions illustrate the conditions to be satisfied by a package name of a class, the loading of which from the application library 108 is desired. Accordingly, the following steps will attempt to load a class from the application library 108 that satisfies any of the conditions. The application library 108 is bundled with the application 106, and the operation evaluation is typically already completed. In other words, stable operation is guaranteed. Even with classes that are present within the application library 108, it may be preferable to use classes that have been updated within the system library in a given instance, and it may instead be preferable to use classes for which stable operation is guaranteed within the application library in another instance.

In select cases, care must be taken when loading a class or package is from the application library 108 is undesirable for security purposes. In Java, for example, a package beginning with "java" or "javax" is a library that is provided by the system, which forms the foundation of system security. Loading such a package from the application library 108 is prohibited, as it constitutes a security violation. Such a class or package is invalidated, even if the foregoing condition is configured. In particular, attempting to configure such a package to the RAM 203 will be prevented; that is, the configuration sequence will not be presented.

In such manner, it is possible to assign priority to loading only a select, authorized package from the application library 108. Any of the three conditions may be utilized; for example, it would be permissible to combine a given package with condition 1, and another package with condition 2. It is also possible to use a mixture of a classname condition and a package name condition.

If it is thus determined in step S401 that the requested class meets the prescribed condition, the process proceeds to step S402, wherein the classloader 103 checks to determine whether or not the class is present within the application library 108. If the class is present within the application library 108, the process proceeds to step S403, wherein the classloader 103 loads the class from the application library 108.

If, on the other hand, the class is not present within the application library 108 in step S402, the process proceeds to step S404, wherein the classloader 103 checks to determine whether or not the class is present within the import library 109. If it is determined that the class is present within the import library 109, the process proceeds to step S405, wherein the class is loaded from the import library 109.

If it is determined in step S404 that the class is not present within the import library 109, or that the requested class does not meet the prescribed condition in step S401, the process proceeds to step S406, wherein the classloader 103 searches for the class, according to the classpath priority sequence. A determination is made in step S407 as to whether or not the class was ultimately found, and if the class was ultimately found, the process proceeds to step S408, wherein the classloader 103 loads the class from the path where it was found, and the process terminates. If, on the other hand, the class was ultimately not found in step S407, the process proceeds to step S409, wherein the classloader 103 generates exception indicating that the class could not be found, and the process terminates.

The process in steps S406 through S409 normally assign priority to loading from the system library 104 over loading from the application library 108 or the import library 109.

According to the first class loading sequence, as pertains to the first embodiment, if a class is present within either the application library 108 or the import library 109, the class is loaded from either the application library 108 or the import library 109, whichever one it may be present in, without searching the system library 104. Consequently, stable operation may be assumed, as it is possible to assign priority to, and use, a class that is presumed to have had its operation already verified.

Second Embodiment

Figure 5A:
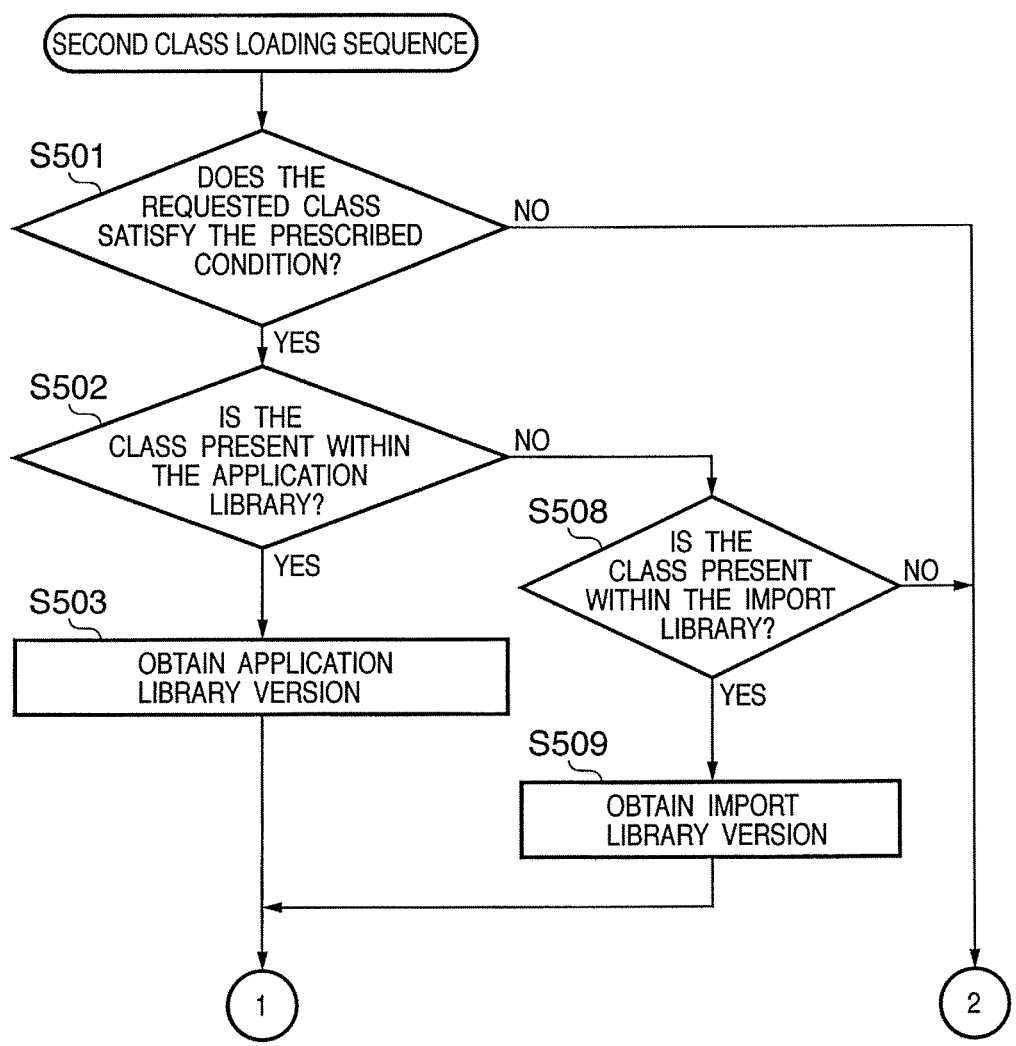
FIGS. 5A and 5B are flowcharts explaining a class loading sequence that is executed in FIG. 3, step S306, according to a second embodiment (second class loading sequence).
Figure 5B:
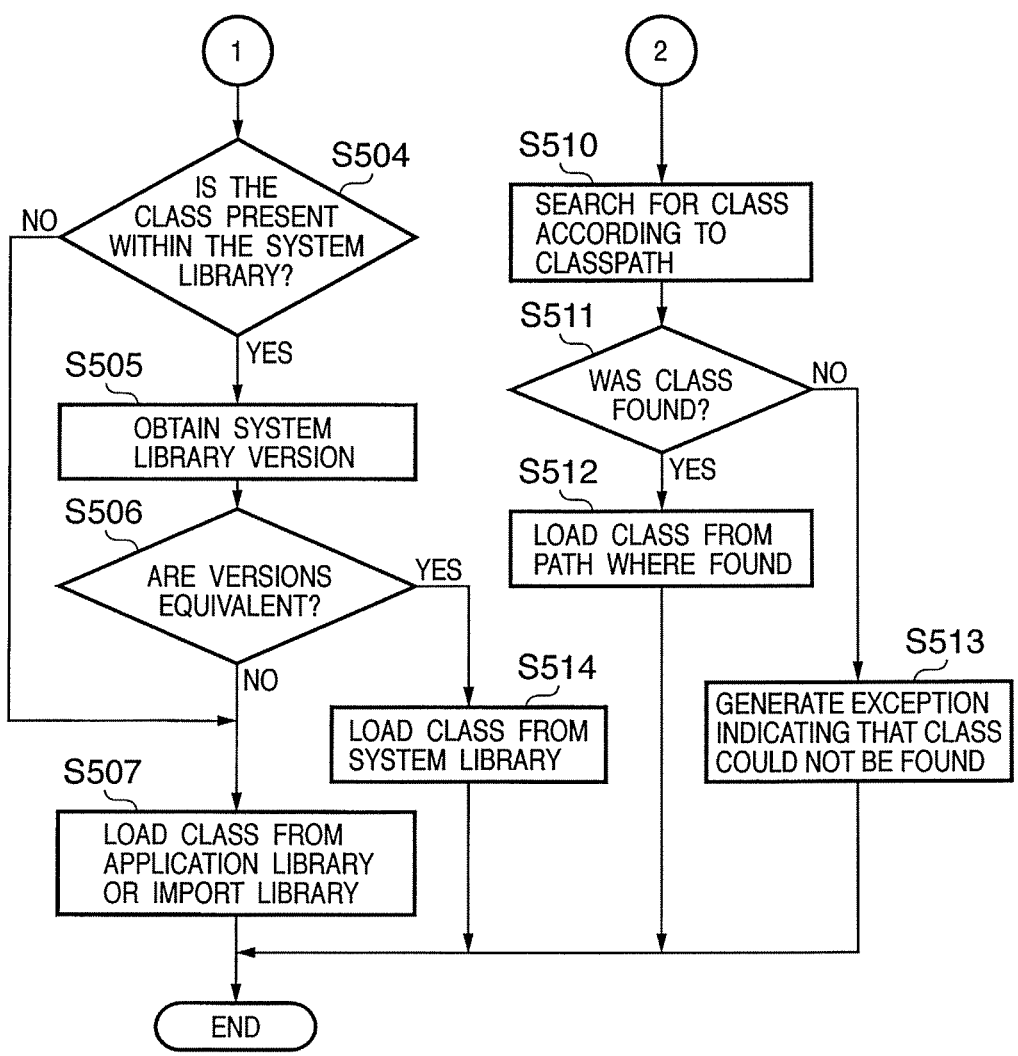

Following is a description of a second class loading sequence, using the flowcharts in FIGS. 5A and 5B, according to the second embodiment.

FIGS. 5A and 5B are flowcharts explaining a class loading sequence that is executed in FIG. 3, step S306, according to the second embodiment (second class loading sequence). The assembly of the JavaVM execution apparatus 110 and the basic flow of the application execution sequence according to the second embodiment are similar to the JavaVM execution apparatus 110 and the basic flow of the application execution sequence according to the first embodiment, as per FIG. 3.

In step S501, the classloader 103 determines whether or not the class that is requested by the interpreter 102 satisfies a pre-established condition. The description of the determination process is omitted, as it is identical to that depicted in FIG. 4, step S401.

If it is determined in step S501 that the requested class meets the prescribed condition, the process proceeds to step S502, wherein the classloader 103 checks to determine whether or not the class is present within the application library 108. If the class is present within the application library 108, the process proceeds to step S503, wherein the classloader 103 obtains version information from the application library 108. Next, in step S504 (FIG. 5B), the classloader 103 checks to determine whether or not the class is present within the system library 104. If it is present, the process proceeds to step S505, wherein the classloader 103 obtains version information from the system library 104. The process then proceeds to step S506, wherein the classloader 103 checks to determine whether the version information obtained from the application library 108 in step S503 is equivalent to the version information obtained from the system library 104 in step S505. If it is determined herein that the respective versions differ from one another, the process proceeds to step S507, wherein the classloader 103 loads the class from the application library 108. If, on the other hand, it is determined in step S506 that the respective versions are equivalent, the process proceeds to step S514, wherein the classloader 103 loads the class from the system library 104.

If the requested class is not present in the system library 104 in step S504, the process proceeds to step S507, wherein the class is loaded from the application library 108.

If the class is not present in the application library 108 in step S502, the process proceeds to step S508, wherein the classloader 103 checks to determine whether or not the class is present within the import library 109. If it is determined that the class is present within the import library 109, the process proceeds to step S509, wherein the version of the import library 109 is obtained, after which the process proceeds to step S504. In such instance, in step S504, the classloader 103 checks to determine whether or not the requested class is present within the system library 104. If it is present, the process proceeds to step S505, wherein the classloader 103 obtains the system library 104 version information. The process then proceeds to step S506, wherein the classloader 103 checks to determine whether the version information obtained from the import library 109 in step S509 is equivalent to the version information obtained from the system library 104 in step S505. If it is determined herein that the respective versions differ from one another, the process proceeds to step S507, wherein the classloader 103 loads the class from the import library 109. If, on the other hand, it is determined in step S506 that the respective versions are equivalent, the process proceeds to step S514, wherein the classloader 103 loads the class from the system library 104.

If it is determined in step S508 that the class is not present within the import library 109, or that the requested class does not meet the prescribed condition in step S501, the process proceeds to step S510, wherein the classloader 103 searches for the class (FIG. 5B), according to the classpath priority sequence. A determination is made in step S511 as to whether or not the class was ultimately found, and if the class was ultimately found, the process proceeds to step S512, wherein the classloader 103 loads the class from the path where it was found. If, on the other hand, the class was ultimately not found, the process proceeds to step S513, wherein the classloader 103 generates exception indicating that the class could not be found, similar to FIG. 4, steps S406 through S409.

It is permissible for the system library 104, the application library 108, and the import library 109 each to be allocated its own respective version information. It is possible, however, for each respective library to be constituted of a plurality of library files; in such a case, it is permissible to obtain version information on a library file that contains a class that is being searched for.

Typically, a jar file format is used as a library in a Java environment. Aside from a class file, the jar file may contain a manifest file, which stores a variety of library information. If version information is written to the manifest file, it is then possible to use the version information so written as the version information for the library.

While the description uses the library's version information, it is permissible to change and load the library on a per class basis, if the version information has been assigned on a per class basis, and can be obtained; the per class version information may also be written to the manifest file.

According to the second class loading sequence, as pertains to the second embodiment, the versions of the libraries that loads the class are compared, and the class is loaded from the system library 104 if the versions are equivalent, allowing time required to load a class to be reduced. The second class load sequence is particularly effective when the application library 108 is external to the JavaVM execution apparatus 110.

It may also speed up the loading or the execution of the class, even when the application library 108 is located within the JavaVM execution apparatus 110.

A first reason is that the system library 104 has a high degree of importance, as it is shared within the system, and thus, it can be located within a storage medium that has a faster access speed than that for the application library 108.

A second reason is that the system library 104, having a high degree of importance, may be converted, prior to execution, into either optimized intermediate code, with the objective of improving execution speed on the part of the CPU 201, or into native code that may be directly executed by the CPU 201.

Third Embodiment

Figure 6:
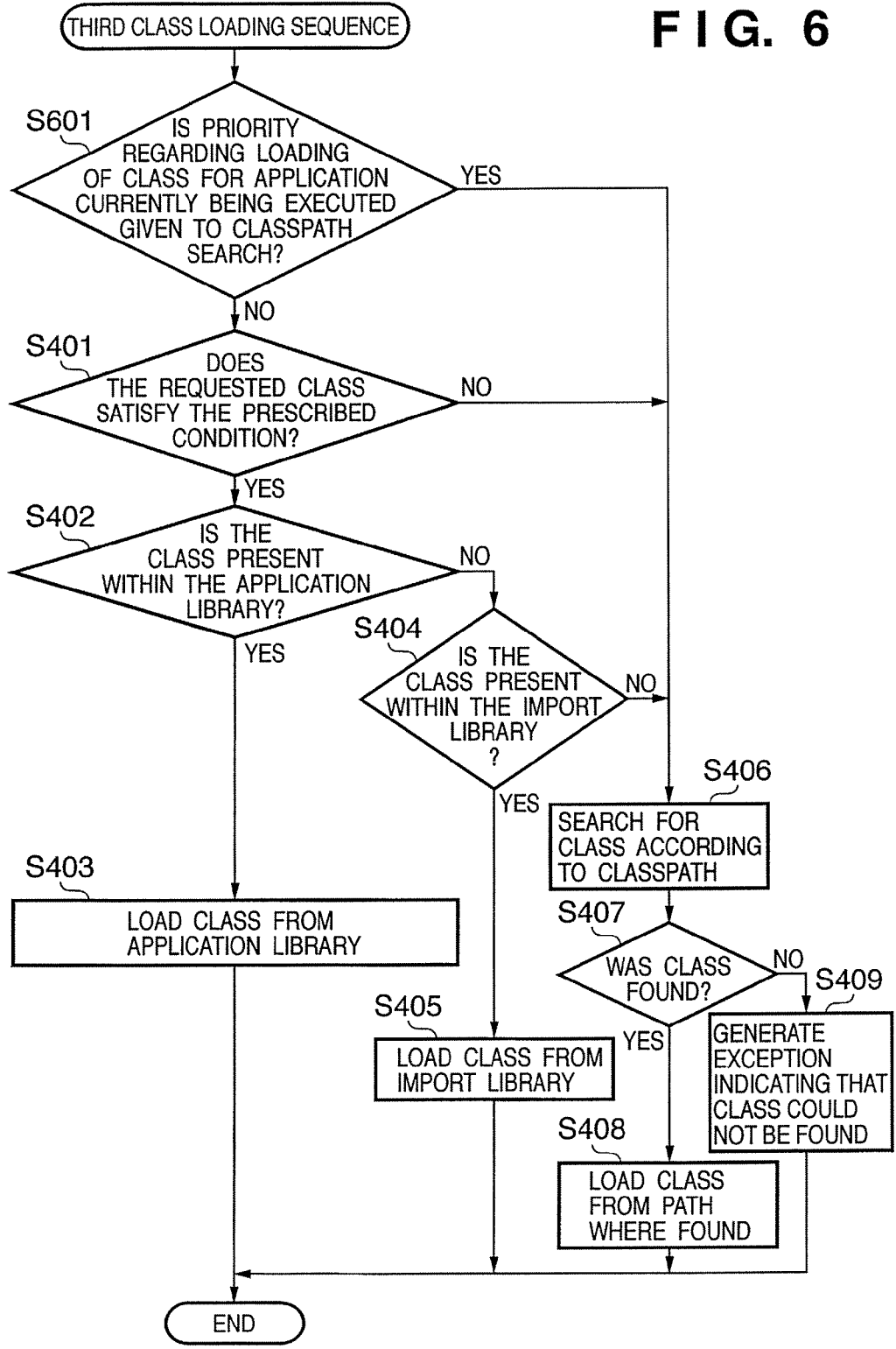
FIG. 6 is a flowchart explaining a class loading sequence that is executed in FIG. 3, step S306, according to a third embodiment (third class loading sequence).

Following is a description of a third class loading sequence, using the flowchart in FIG. 6, according to the third embodiment.

FIG. 6 is a flowchart describing a class loading sequence that is executed in FIG. 3, step S306, according to the third embodiment (third class loading sequence). The assembly of the JavaVM execution apparatus 110 and the basic flow of the application execution sequence according to the third embodiment are similar to the JavaVM execution apparatus 110 and the basic flow of the application execution sequence according to the first embodiment, as per FIG. 3.

In step S601, the classloader 103 determines whether or not an application that is being executed assigns priority to a classpath search with regard to class loading. A flag is presumed to be stored in the RAM 203, on a per application basis, that signifies whether or not priority is assigned to the classpath search, in order to perform the determination (not shown).

If it is determined in step S601 that priority has not been assigned to the classpath search, the process proceeds to step S401, wherein the classloader 103 determines whether or not the class that is requested by the interpreter 102 satisfies a pre-established condition. If the requested class does not meet the prescribed condition in step S401, or if it is determined in step S601 that priority has been assigned to the classpath search, the process proceeds to step S406, wherein the classloader 103 searches for the class, according to the classpath priority sequence. The description of the process subsequent to a determination of "yes" in step 401, as well as the processing subsequent to step S406, is omitted, as they are identical to that depicted in FIG. 4, steps S402 through S405, and steps S407 through S409.

The third class loading sequence, as pertains to the third embodiment, assigns priority to the classpath search for a given application, allowing another application to load a class from the application library 108. Take, for example, an instance of a new version of a class being provided as a part of the system library 104. In such an instance, an application would use the version of the class, that is present within the system library 104. It would be possible, however, to configure another application to use a previous version of the class, that is present within the application library 108. It is thus possible to operate the JavaVM execution apparatus 110.

As another example, consider an application loading a class from the application library 108. It is conceivable that, following a bug fix, a new version of the class might be installed into the system library 104, and altered to be loaded therefrom. While neither the application 106, nor the application library 108 that is bundled therein, can be easily altered, such a circumstance might well arise, given the replaceability of the software within the JavaVM execution apparatus 110. In such instance, if the flag for the application 106 that signifies whether or not priority is assigned to the classpath search is changed simultaneously with performing a replacement of software that contains the system library 104, it is possible to alter the operation in accordance with the user's intentions.

Fourth Embodiment

Figure 7A:
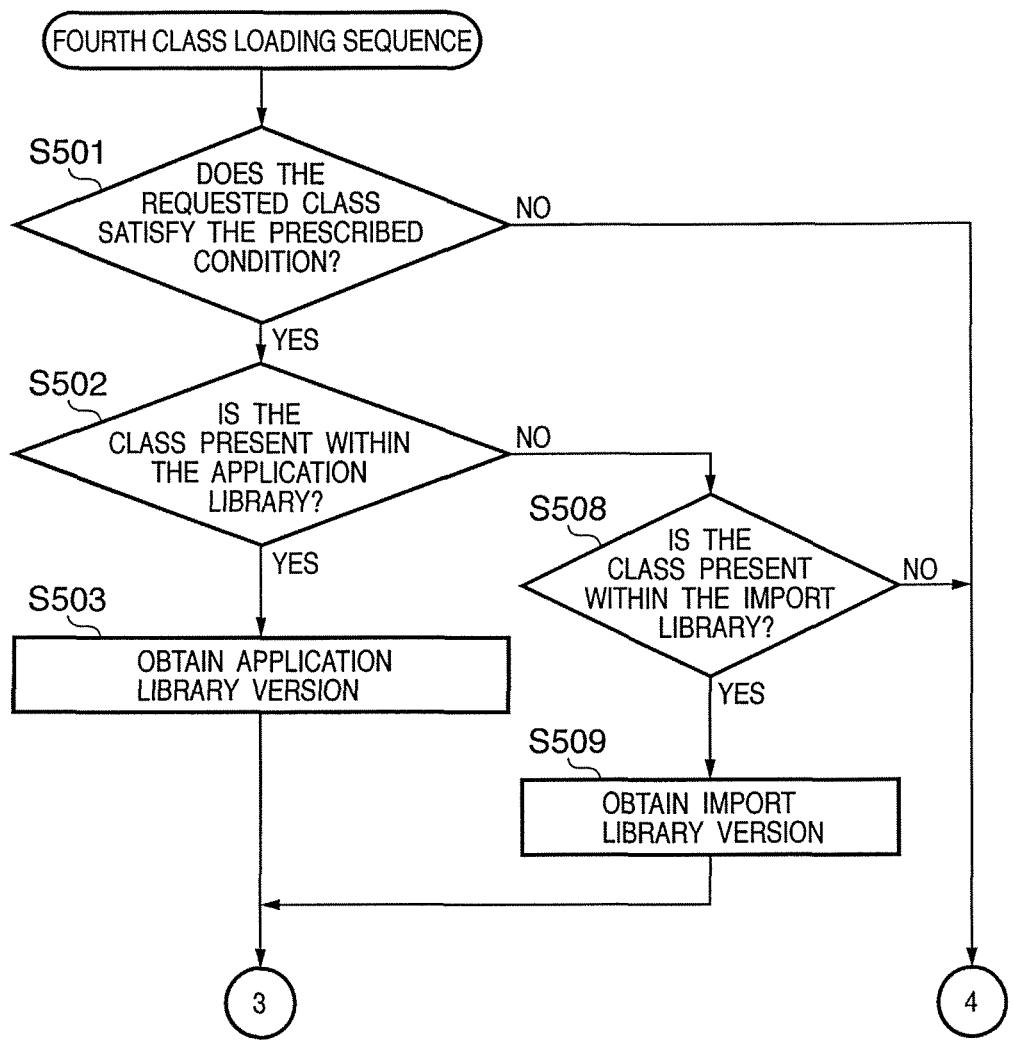
FIGS. 7A and 7B are flowcharts explaining a class loading sequence that is executed in FIG. 3, step S306, according to a fourth embodiment (fourth class loading sequence).
Figure 7B:
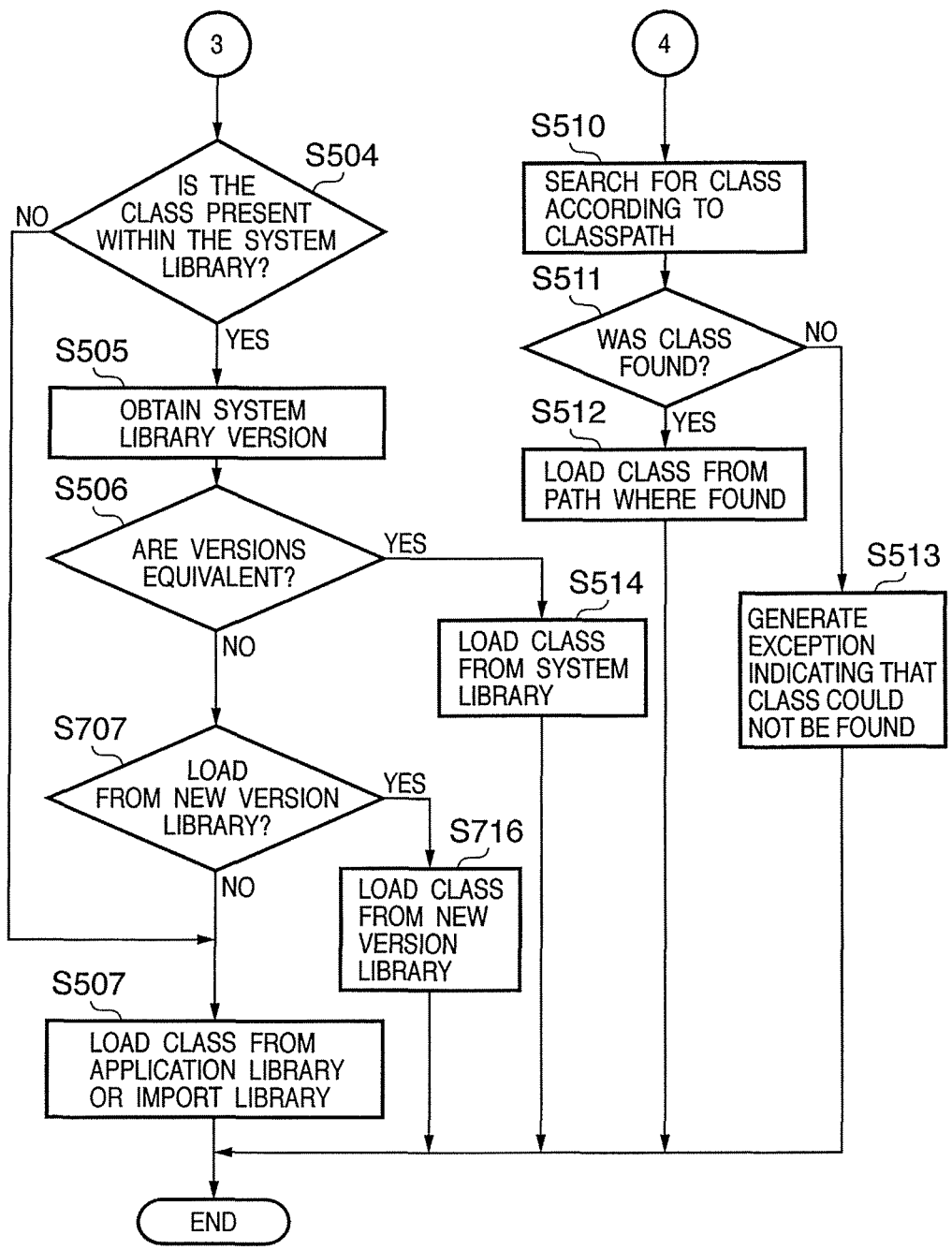

Following is a description of a fourth class loading sequence, using the flowcharts in FIGS. 7A and 7B.

FIGS. 7A and 7B are flowcharts explaining a class loading sequence that is executed in FIG. 3, step S306, according to the fourth embodiment (fourth class loading sequence). As is apparent from FIGS. 7A and 7B, the fourth class loading sequence forms a step S707 between FIG. 5B, the second class loading sequence, step S506 and step S507, and a step S716 subsequent to a determination of "yes" in step S707. A description of the processing that the fourth class loading sequence has in common with the second class loading sequence is omitted. The assembly of the JavaVM execution apparatus 110 and the basic flow of the application execution sequence according to the fourth embodiment are similar to the JavaVM execution apparatus 110 and the basic flow of the application execution sequence according to the first embodiment, as per FIG. 3.

In step S506, the classloader 103 checks to determine whether the version information obtained from the application library 108 in step S503 is equivalent to the version information obtained from the system library 104 in step S505. If it is determined herein that the respective versions differ from one another, the process proceeds to step S707 (FIG. 7B), wherein the classloader 103 checks to determine whether to load from the new version library. A flag is present in the RAM 203 that signifies whether to load from the new version library, in order to make the determination (not shown). It is permissible for a single instance of the flag to be present within the JavaVM execution apparatus 110, as well as for the flag to be present on a per application or per library basis. If it is determined in step S707 that loading from the new version library should not take place, the process proceeds to step S507, wherein the classloader 103 loads the class from the application library 108, or from the import library 109. If, on the other hand, it is determined in step S707 that loading should take place, the process proceeds to step S716, wherein the class is loaded from the library of new version.

If it is determined in step S506 that the respective versions are equivalent, the process proceeds to step S514, wherein the classloader 103 loads the class from the system library 104.

Fifth Embodiment

Figure 8:
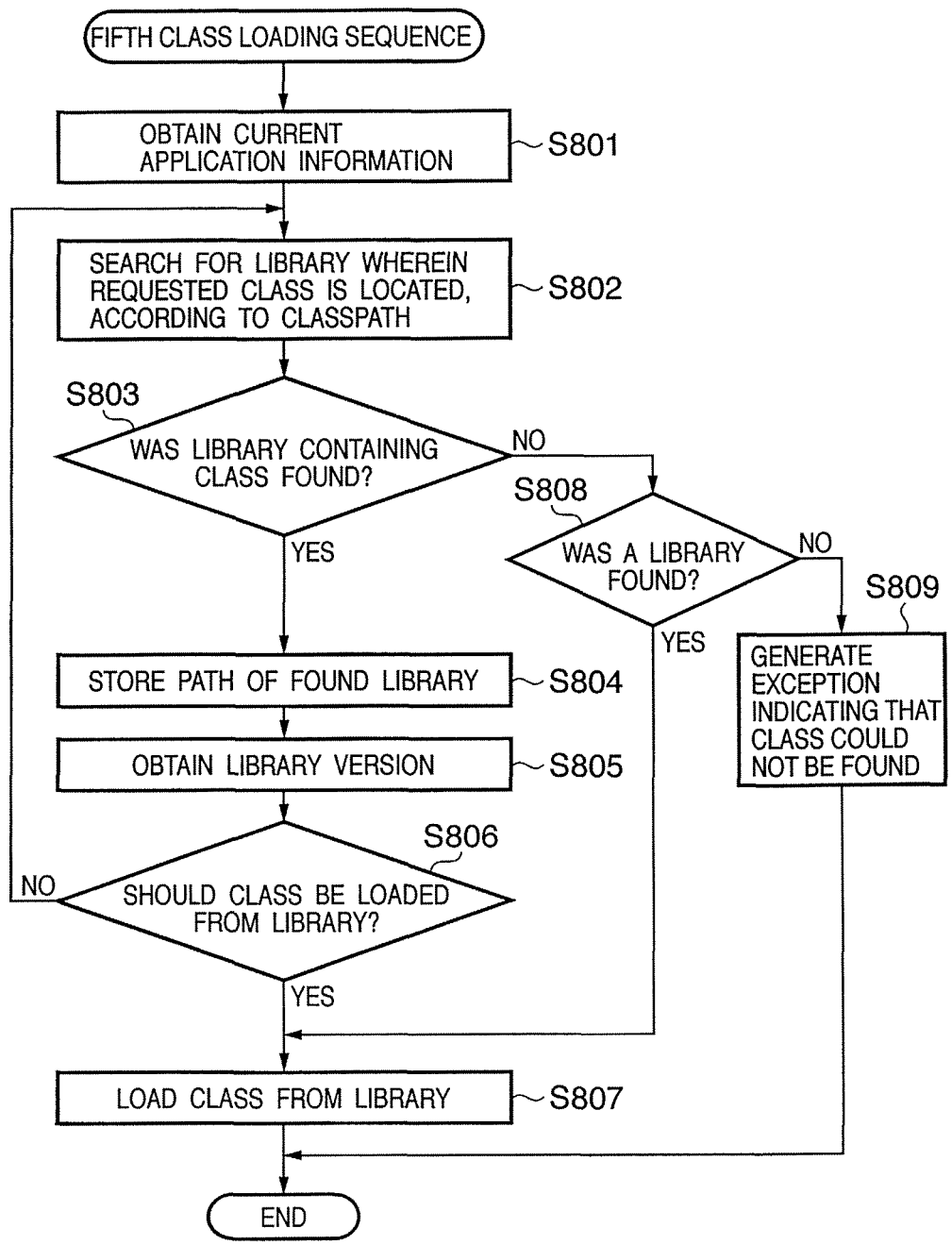
FIG. 8 is a flowchart explaining a class loading sequence that is executed in FIG. 3, step S306, according to a fifth embodiment of the present invention (fifth class loading sequence).

Following is a description of a fifth class loading sequence, using the flowchart in FIG. 8.

FIG. 8 is a flowchart explaining a class loading sequence that is executed in FIG. 3, step S306, according to the fifth embodiment (fifth class loading sequence). The assembly of the JavaVM execution apparatus 110 and the basic flow of the application execution sequence according to the fifth embodiment are similar to the JavaVM execution apparatus 110 and the basic flow of the application execution sequence according to the first embodiment, as per FIG. 3.

The process commences when the interpreter 102 requests that the classloader 103 load a class, whereupon, in step S801, the classloader 103 obtains information on the application 106, which is being executed at the current time. In order to determine the application context, that is, which the application is being executed, the process follows a call stack with regard to a thread that is being executed by the CPU 201. A determination is made regarding from which application a method class that is stored in the stack and is being called is loaded. In step S802, the classloader 103 searches for the library wherein the requested class is located, according to the classpath. In step S803, a determination is made as to whether the library containing the class was found, and if it was found, the process proceeds to step S804, wherein the path of the found library is stored. Next, in step S805, the version of the library is obtained. In step S806, the classloader 103 determines whether or not the class should be loaded from the library, in accordance with the application information that was obtained in step S801 and the library information and the version information that were obtained in steps S804 and S805. If it is determined that the class will not be loaded from the library, the process returns to step S802.

The determination in step S806 is performed in accordance with a library table 901 in FIG. 9. The table is stored in either the RAM 203, the flash ROM 207, or the hard disc drive 209.

FIG. 9 depicts a view illustrating an example of a library information table according to the fifth embodiment.

The library, version, and position of the priority library that loads the class are stored herein.

Using such a library information table 901, it is possible to ascertain the position of the library that loads the class, in accordance with the application 106 information, the library information, and, if necessary, even the version information.

Take, for example, a request to load a class YYY, while an application AAA is being executed. The class YYY is presumed to be contained within a library aaa.jar. In such instance, querying the library information table 901 reveals that the position of the priority library for class loading that corresponds to "application=AAA" and "library=aaa.jar" is the application library.

If the library that was found in the search in step S802 is the system library 104, it will not match the application library that is directed by the library information table 901. Accordingly, in step S806, the classloader 103 determines that it should not load the class from the system library 104, returns to step S802, and searches for the class beginning with the next search location indicated by the classpath.

If the library that is found by the second search is the application library 108, it would match the application library that is directed by the library information table 901. Accordingly, in step S806, the classloader 103 determines that it should load the class from the application library 108, and proceeds to step S807, wherein the classloader 103 loads the class from the library.

To take another example, a request is generated to load a class YYY, while an application BBB is being executed. As per the foregoing example, the class YYY is presumed to be contained within a library aaa.jar. It is presumed to be found within the system library 104 in FIG. 8, step S802. In such instance, the position of the priority library for class loading in the library information table 901 is the system library, and in step S806, the classloader 103 determines that the class should be loaded from the system library 104, and proceeds to step S807.

It is permissible for the information on the position of the priority library for class loading, that is present in the library information table 901, to be a delineation of from where loading should take place. Accordingly, it would be permissible, for example, to present a position classification such as application library or system library, and it would also be permissible to store the very library path that points directly to the library. According to the example, the version information that was obtained in step S805 was not used in determining whether the class should be loaded or not. The reason was that the version field corresponding to application AAA, library aaa.jar in the library information table 901 in FIG. 9 was blank.

The following example will be a description that uses the version information.

A request is generated to load a class YYY, while an application CCC is being executed. As per the foregoing example, the class YYY is contained within a library aaa.jar. The library that is found in step S804 is presumed to be the system library 104. In step S805, the system library 104's version is obtained. In such instance, in step S806, the classloader 103 obtains version information corresponding to "application=CCC," "library=aaa.jar," and "position of the priority library for class loading=system library," in the library information table 901.

In FIG. 9, the system library version information that corresponds to "application=CCC" and "library=aaa.jar" is "2.0 or later".

Accordingly, in step S806, a determination is made as to whether or not the version information obtained in step S805 satisfies the version information condition. If the condition is satisfied, a determination is made that the class should be loaded from the library.

A search is made in step S802 according to the classpath, meanwhile, and if there ultimately is no library in step S803 that satisfies the condition in step S806, the process proceeds to step S808, wherein the classloader 103 checks that a library has been found that contains the requested class, or in other words, whether the library stored in step 804 is present or not. The library stored herein is a library that was rejected due to the conditional determination in step S806, despite being found to contain the class. If a library has been found, however, then, the library contains the requested class, and thus, the process proceeds to step S807, wherein the class is loaded. If, on the other hand, no library is found in step S808, the process proceeds to step S809, wherein the classloader 103 causes an exception to be displayed, to the effect that the class could not be found, and the process terminates.

A variety of embodiments aside from the foregoing are conceivable, in which a plurality of found libraries are present. In such instance, it is conceivable that a variety of library selection methods, as described in the first through fourth class loading sequences may be applied, which may include, but are not limited to, the following:

1. Assigning priority to the first found library;
2. Assigning priority to the application library 108; or
3. Assigning priority to the new library version.

When a library search is performed according to the classpath in step S802 in the flowchart in FIG. 8, it is conceivable that there may be a variety of variations with regard to the search method herein. In such instance, it is conceivable that a variety of library selection methods, as described in the first through fourth class loading sequences may be applied, which may include, but are not limited to, the following:

1. Assigning priority to the first found library;
2. Assigning priority to the application library 108; or
3. Assigning priority to the new library version.

Sixth Embodiment

Figure 10A:
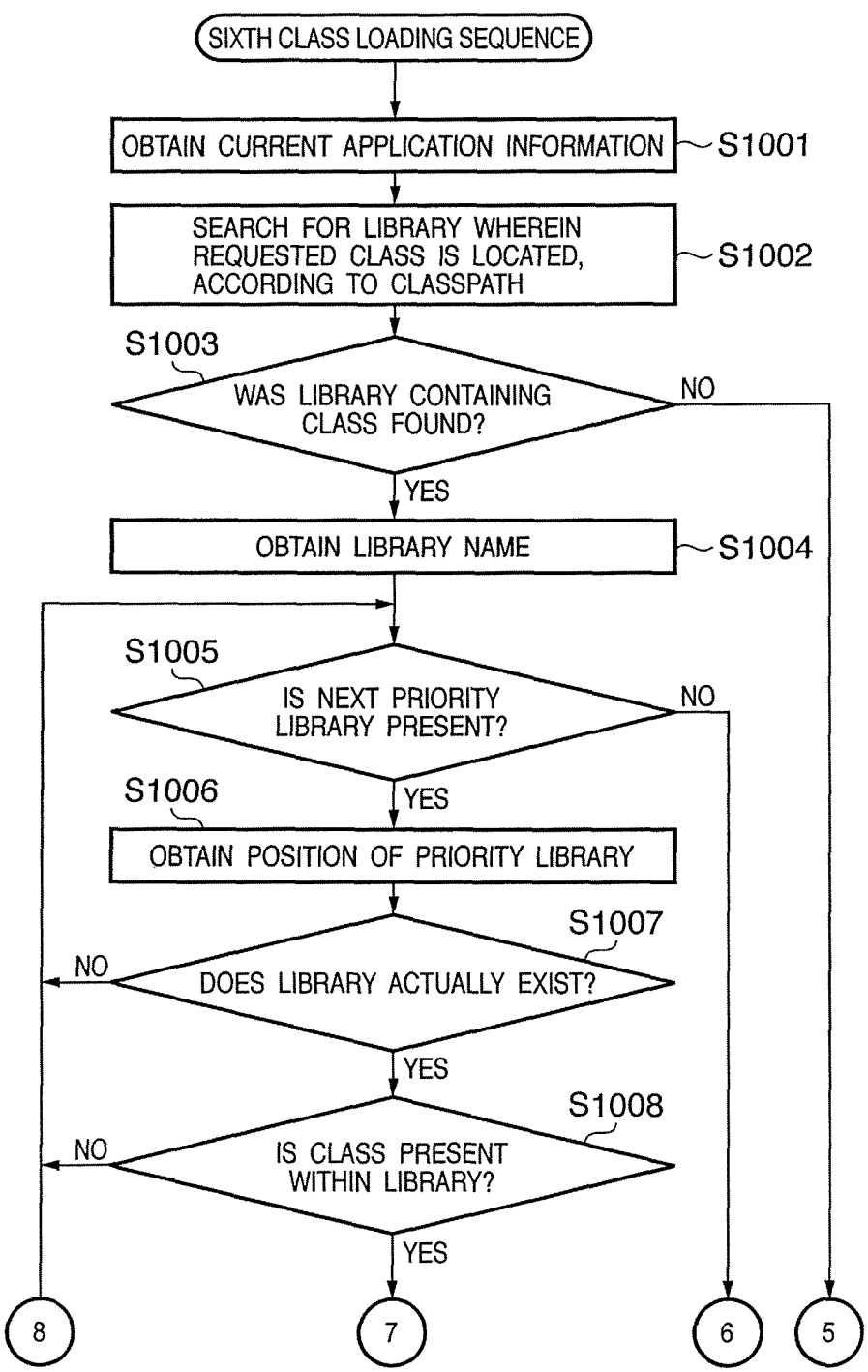
FIGS. 10A and 10B are flowcharts explaining a class loading sequence that is executed in FIG. 3, step S306, according to a sixth embodiment of the present invention (class loading sequence six).
Figure 10B:
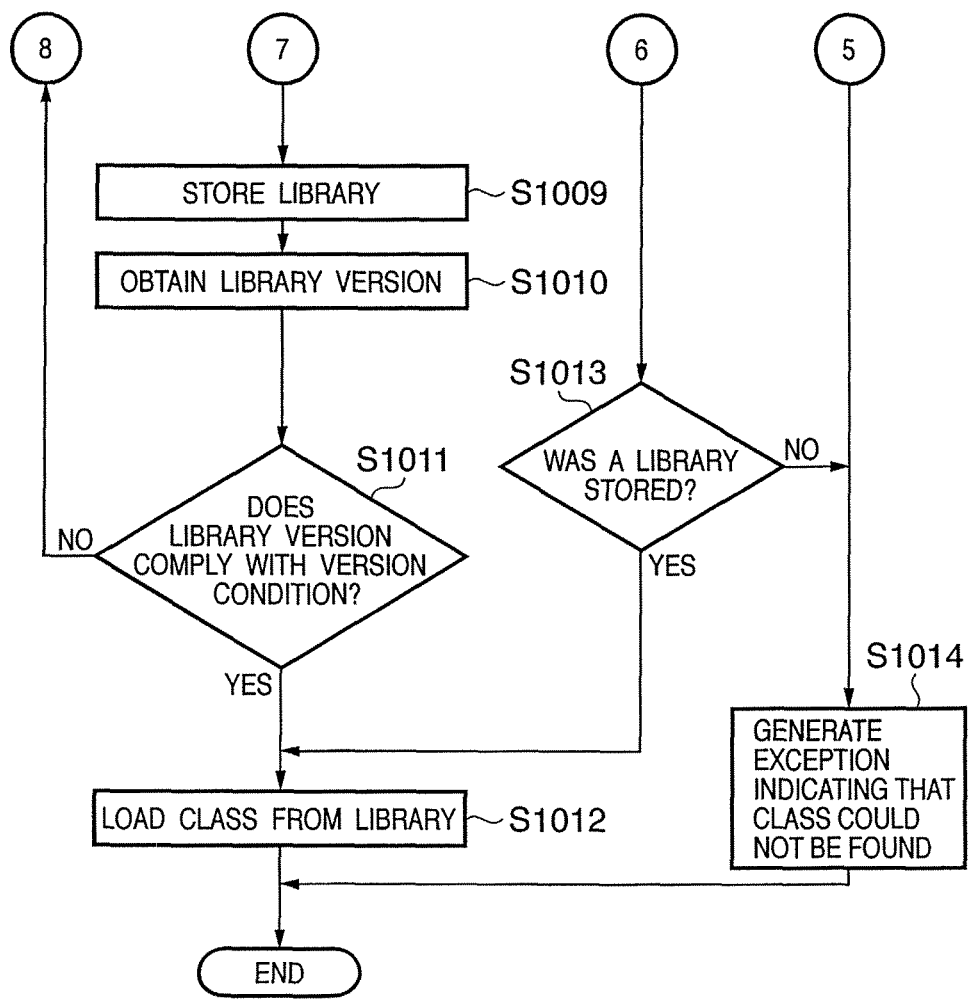

Following is a description of a sixth class loading sequence, using the flowcharts in FIGS. 10A and 10B.

FIGS. 10A and 10B are flowcharts describing a class loading sequence that is executed in FIG. 3, step S306, according to the sixth embodiment (sixth class loading sequence). The assembly of the JavaVM execution apparatus 110 and the basic flow of the application execution sequence according to the sixth embodiment are similar to the JavaVM execution apparatus 110 and the basic flow of the application execution sequence according to the first embodiment, as per FIG. 3.

In step S1001, the classloader 103 obtains information on the application 106, which is being executed at the current time, as per FIG. 8, step S801. In step S1002, the classloader 103 searches for the requested class, according to the classpath. Consequently, a determination is made in step S1003 as to whether or not the library containing the class was found. If the library containing the class was found, the process proceeds to step S1004, wherein the library name is obtained. The process then proceeds to step S1005, wherein the classloader checks whether or not a library next to be prioritized is present. The determination is made by querying a library information table 1101 in FIG. 11, which is an arrangement of the library information table 901.

FIG. 11 depicts a view illustrating an example of a library information table according to the sixth embodiment.

Following is a description of the differences between the library information table 901 depicted in FIG. 9, and the table 1101 depicted in FIG. 11. In the FIG. 9, table 901, there is information on only one position of the priority library that loads the class. In FIG. 11, on the other hand, there is a list of priority library information, containing from a first priority library to a third priority library. Whereas the list in FIG. 11 describes up through the third priority library, there is no limit on the number of priority libraries herein.

In step S1005, the classloader 103 queries the library information table 1101, based on the application information that was obtained in step S1001 and the library name that was obtained in step S1004, and checks whether or not the position of the next priority library is present. When executing the step, the classloader 103 naturally checks whether or not the position of the first priority library is present. The check method is similar to the method described using the library information table 901.

If the position of the library to be prioritized is present in step S1005, the process proceeds to step S1006, wherein the position of the library to be prioritized is obtained. In step S1007, the classloader 103 checks whether a library with the library name that was obtained in step S1004 actually exists at the library position. If the library does actually exist therein, the process proceeds to step S1008, wherein the classloader 103 checks whether the requested class is present within the library. If the class is present therein, the process proceeds to step S1009 (FIG. 10B), wherein the classloader 103 stores the library in the RAM 203 or other location, proceeds to step S1010, wherein it obtains the library version. In step S1011, the classloader 103 checks whether the version complies with the library information table 1101 version condition. The check method is identical to the method described using the library information table 901. If the version complies with the version condition, the process proceeds to step S1012, wherein the classloader 103 loads the class from the library.

If, on the other hand, the library does not actually exist in step S1007, or if the class is not present within the library in step S1008, or if the version does not comply with the version condition in step S1011, the process returns to step S1005, wherein the position of the next priority library is searched for. The search for the priority library is thus performed by way of the loop process described herein, starting with the first priority library and proceeding in order therefrom.

If no next priority library is present in step S1005, the process proceeds to step S1013 (FIG. 10B), wherein the classloader 103 checks whether or not the library that was stored in step S1009 is present. The library stored herein is the library that is known to contain the requested class. If the stored library is present in step S1013, the process proceeds to step S1012, wherein the class is loaded from the library. If, on the other hand, the stored library is not present in step S1013, or if a library containing the class cannot be found in step S1003, the process proceeds to step S1014 (FIG. 10B), wherein the classloader 103 generates exception indicating that the class could not be found.

While the class loading sequences according to the respective embodiments have been described, it is possible for the class loading sequences to be altered on a per application basis. It would be possible by having the classloader 103 that is present within the JavaVM 101 to identify an application that is being executed at a given time, and replace the class load sequence. In order to determine the application context, that is, which application is being executed, the process follows a call stack with regard to a thread that is being executed by the CPU 201. A determination is made regarding from which application a method class that is stored in the stack and is being called is loaded.

While not depicted in the drawings, it should be clear to person skilled in the art that it would also be possible for the class loading sequences to be altered on a per application basis by having each respective application equipped with a classloader, or application classloader. In such instance, differences among the application classloaders identify the respective applications.

According to the embodiment, the Java programming language, as well as programs and classes that use the Java programming language, have been used as examples in the descriptions. It should be known to a person skilled in the art, however, that the essentials of the present invention are applicable to an object-oriented program execution apparatus in general, and are not specific to a Java system.

Other Embodiments

While the embodiments of the present invention have been described, it is permissible to apply the present invention to a system constituted of a plurality of devices, and it may also be applied to an apparatus constituted of a single device.

The present invention may also be achieved by supplying, either directly or remotely, to a system or an apparatus, a software program that fulfills the functions of the embodiments, and by the computer within the system or the apparatus reading out and executing the program so supplied. In such instance, the format need not be that of a program, provided that the functions of the program are present.

In order to fulfill the function processing of the present invention with a computer, the program code that is itself installed in the computer may also fulfill the present invention. In other words, the claims of the present invention also include the computer program that itself fulfills the function processing of the present invention. In such instance, the format of the program may be object code, a program executed by an interpreter, script data that is supplied to an operating system, or other format, provided that the functions of the program are present.

A variety of recording media may be used to supply the program. Examples include, but are not limited to, a hard drive, an optical disk, a magneto-optical disk, an MO, a CD-ROM, a CD-R, a CD-RW, a magnetic tape, a nonvolatile memory card, ROM, or a DVD, including, but not limited to, a DVD-ROM or DVD-R.

As another program supply method, a program may also be supplied by using a browser on a client computer to connect to a webpage on the Internet, and download the program from the website to a hard drive or other recording medium. In such instance, it is permissible that what is downloaded is either the computer program of the present invention itself, or a compressed file that contains an auto-install function. Fulfillment is also possible by partitioning the program code that constitutes the program of the present invention into a plurality of files, and downloading the respective files each from a different webpage. In other words, the claims of the present invention also include a World Wide Web server that allows a plurality of users to download the program files that fulfill the function processing of the present invention.

A format that encrypts the program of the present invention, stores it on a CD-ROM or other recording medium, and distributes it to a user. In such instance, a user who satisfies a prescribed condition will be allowed to download key information from a webpage over the Internet that will decrypt the encryption, and the encrypted program will be installed on a computer in an executable format.

Fulfillment is also possible in a format other than the formats in which the function of the embodiment is fulfilled, by having the computer execute the read-out program. For example, having an operating system running on the computer, or other software, perform the actual processing, either whole or in part, and the processing may also fulfill the function of the embodiment.

It is also permissible for a program that is read out from a recording medium to be written to a into a memory that is either built into a function expansion board that is installed within a computer, or that is built into a function expansion unit that is connected to the computer. In such instance, a CPU or other hardware that is either built into the function expansion board, or that is built into the function expansion unit, performs the actual processing, either whole or in part, in accordance with the program instructions, and the processing fulfills the function of the embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-024740, filed Feb. 1, 2006, which is hereby incorporated by reference herein in its entirety.

What is claimed is:

1. An execution apparatus that executes an application program, comprising:
   at least one processor coupled via a bus to a memory, the processor being programmed to control one or more of:
   an execution unit configured to execute an application program;
   a determination unit configured to determine whether or not a class name or a package name of a class requested by the application program has predetermined characters; and
   a loading control unit configured to:
      (i) in a case that the determination unit determines that the class name or a package name of the class requested by the application program has the predetermined characters, load the class requested by the application program from an application library, with priority given to the application library bundled with the application program, rather than a predetermined system library, and
      (ii) in a case that the determination unit determines that the class name or a package name of the class requested by the application program does not have the predetermined characters and that a predetermined system library version within a virtual machine and an application library version are equivalent, load the class requested by the application program from the predetermined system library.

2. The apparatus according to claim 1, wherein the loading unit loads the class from the predetermined system library, in a case that a class name or a package name of the class requested by the application program does not have the predetermined characters and a version of the class within the application library and a version of the class within the predetermined system library are equivalent.

3. An execution apparatus that executes an application program, comprising:
   at least one processor coupled via a bus to a memory, the processor being programmed to control one or more of:
   an execution unit configured to execute an application program;
   a determination unit configured to determine whether or not a class name or a package name of a class requested by the application program has predetermined characters; and
   a search unit configured to:
      (i) in a case that the determination unit determines that the class name or a package name of the class requested by the application program has the predetermined characters, search for the class requested by the application program with priority given to an application library bundled with the application program, rather than a predetermined system library, and
      (ii) in a case that the determination unit determines that the class name or a package name of the class requested by the application program does not have the predetermined characters and that a predetermined system library version within a virtual machine and an application library version are equivalent, search for the class requested by the application program from the predetermined system library according to a classpath.

4. An execution method that executes an application program, comprising:
   executing an application program;
   determining whether or not a class name or a package name of a class requested by the application program has predetermined characters;
   in a case that it is determined that the class name or a package name of the class requested by the application program has the predetermined characters, loading the class requested by the application program from an application library, with priority given to the application library bundled with the application program, rather than a predetermined system library; and
   in a case that it is determined that the class name or a package name of the class requested by the application program does not have the predetermined characters and that a predetermined system library version within a virtual machine and an application library version are equivalent, loading the class requested by the application program from the predetermined system library.

5. The method according to claim 4, wherein the class is loaded from the predetermined system library in a case that a class name or a package name of the class requested by the application program has the predetermined characters and a version of the class within the application library and a version of the class within the predetermined system library are equivalent.

6. An execution method that executes an application program, comprising:
   executing an application program;
   determining whether or not a class name or a package name of a class requested by the application program has predetermined characters;
   in a case that it is determined that the class name or a package name of the class requested by the application program has the predetermined characters, searching for the class requested by the application program, with priority given to an application library bundled with the application program, rather than a library according to a classpath; and
   in a case that it is determined that the class name or a package name of the class requested by the application program does not have the predetermined characters and that a predetermined system library version within a virtual machine and an application library version are equivalent, searching, in the predetermined system library according to the classpath, for the class requested by the application program.

7. The method according to claim 6, wherein the class is loaded from the predetermined system library in a case that a package name of the class requested by the application program has the predetermined characters and an application library version and a system library version are equivalent.

8. A non-transitory storage medium storing a computer program which, when executed by a computer, causes the computer to perform steps comprising:
   executing an application program;
   determining whether or not a class name or a package name of a class requested by the application program has predetermined characters;
   in a case that it is determined that the class name or a package name of the class requested by the application program has the predetermined characters, loading the class requested by the application program from an application library, with priority given to the application library bundled with the application program, rather than a predetermined system library; and
   in a case that it is determined that the class name or a package name of the class requested by the application program does not have the predetermined characters and that a predetermined system library version within a virtual machine and an application library version are equivalent, loading the class requested by the application program from the predetermined system library.

9. A non-transitory storage medium storing a computer program which, when executed by a computer, causes the computer to perform steps comprising:
   executing an application program;
   determining whether or not a class name or a package name of a class requested by the application program has predetermined characters;
   in a case that it is determined that the class name or a package name of the class requested by the application program has the predetermined characters, searching for the class requested by the application program, with priority given to an application library bundled with the application program, rather than a library according to a classpath; and
   in a case that it is determined that the class name or a package name of the class requested by the application program does not have the predetermined characters and that a predetermined system library version within a virtual machine and an application library version are equivalent, searching, in the predetermined system library according to the classpath, for the class requested by the application program.

* * * * *